H. H. SCHUSTER.
ARMORED INNER TUBE.
APPLICATION FILED MAY 5, 1917.
1,297,408. Patented Mar. 18, 1919.
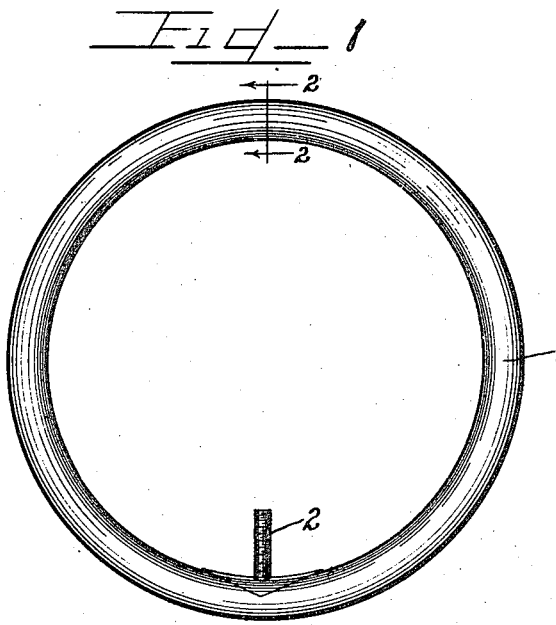
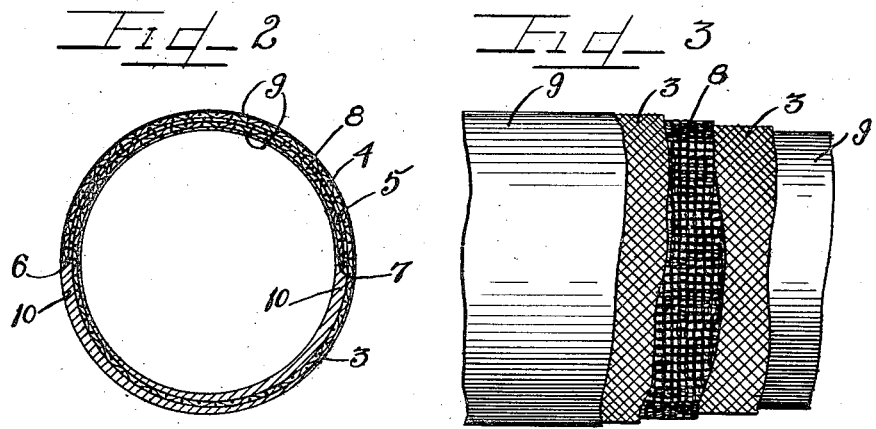
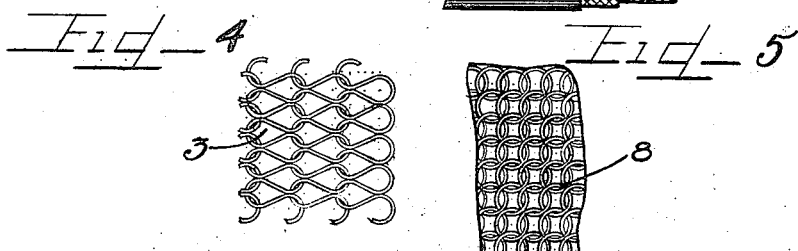
WITNESSES:
INVENTOR.
HARRY H. SCHUSTER
BY
ATTORNEYS.

UNITED STATES PATENT OFFICE.

HARRY H. SCHUSTER, OF CHICAGO, ILLINOIS.

ARMORED INNER TUBE.

1,297,408.  Specification of Letters Patent.  Patented Mar. 18, 1919.

Application filed May 5, 1917. Serial No. 166,535.

*To all whom it may concern:*

Be it known that I, HARRY H. SCHUSTER, a citizen of the United States, and a resident of the city of Chicago, in the county of Cook and State of Illinois, have invented certain new and useful Improvements in Armored Inner Tubes; and I do hereby declare that the following is a full, clear, and exact description of the same, reference being had to the accompanying drawings, and to the numerals of reference marked thereon, which form a part of this specification.

Inner tubes for vehicle tires, which are usually constructed of comparatively thin sheet rubber tubing, have always proven unsatisfactory, and have been the source of considerable trouble and annoyance to vehicle owners, for the reason that thin rubber inner tubes which are very expensive are also weak and liable to tear or blow out at any time, the damage resulting to such tubes often being so great that replacement of the same is necessary.

This invention relates to an improved form of a rubber inner tube for vehicle tires reinforced with knit fabric and metallic armor mesh to afford a comparatively thin elastic casing of great strength and efficiency.

It is an object of this invention to construct a reinforced rubber inner tube for use in vehicle tires.

It is also an object of this invention to provide a rubber inner tube having means embedded therein to strengthen the same.

It is furthermore an object of this invention to construct a rubber inner tube for vehicle tires having a knit fabric embedded in the rubber with the ends of the knit fabric overlapping each other and having disposed therebetween a metallic armor mesh to afford an elastic tubing of great strength and durability.

It is an important object of this invention to create an improved form of an inner tire tube simple and of effective construction, embracing a metallic reinforcing mesh disposed between the overlapping margins of a loosely woven fabric, which together with said mesh is completely embedded in rubber to produce a reinforced elastic inner tubing for tires.

A further object of this invention is the construction of an improved form of an inner tube wherein the outer half thereof is reinforced by a plurality of layers of loosely woven fabric between which a layer of metallic armor mesh is disposed, while the inner half of the tube is reinforced by a simple layer of fabric only integrally connected with each of the outer fabric layers to form an elastic inner tube of great durability.

Other and further important objects of this invention will be apparent from the disclosures in the drawings and specifications.

The invention (in a preferred form) is illustrated in the drawings and hereinafter more fully described.

On the drawings:

Figure 1 is a side elevational view of an inner tube embodying the principles of this invention.

Fig. 2 is an enlarged section taken on line 2—2, of Fig. 1.

Fig. 3 is an enlarged top elevational view of a fragment of an inner tube, with parts broken away to show the construction thereof.

Fig 4 is an enlarged plan view of the knit fabric used in reinforcing the inner tube.

Fig. 5 is an enlarged plan view of the armor mesh used in reinforcing the inner tube.

As shown on the drawings:

The reference numeral 1, designates as a whole the reinforced rubber inner tube embodying the principles of this invention, and having rigidly secured by any suitable means on the inner periphery thereof a radially and inwardly directed valve stem 2. The inner tube, as clearly shown in Figs. 2 and 3, comprises a knit or loosely woven reinforcing fabric 3, which is disposed to extend completely around the tubing with the end margins 4 and 5, thereof overlapping one another in the outer half of the tubing so that the respective edges 6 and 7, of said margins are positioned diametrically opposite each other on each side of the tubing. To further reinforce the tube 1, a single layer of armor mesh 8, is mounted between the overlapping margins 4 and 5, of the knit fabric, with the edges thereof disposed opposite one another and adjacent the fabric edges 6 and 7, as shown in Fig. 2. To complete the tube 1, the reinforcing fabric and mesh, arranged as above described, are completely invested with or embedded in rubber 9, which during the process of manufacture not only coats the knit fabric and armor mesh but also fills up all of the openings therein to create a comparatively thin elastic inner tube of uniform thickness, with the rubber coating the single layer of the reinforcing knit fabric 3, disposed in the inner half of the tube 1, being of a greater thickness as denoted by the numeral 10, where the same abuts the adjacently disposed edges of the knit fabric and armor mesh and then tapers gradually on the outer and inner sides of said single layer portion of the knit fabric to a center line on each side of the tube, adjacent the position where the edges of the armor mesh terminates. An inner tube is thus afforded, of uniform thickness, with the outer half reinforced to prevent punctures and blowouts, and with the inner half more flexible than the outer half to allow proper inflation of the inner tube without impairing the cushioning effect of the inner tube.

From the construction as described it will be seen that the reinforced inner tube 1, is flexible and elastic, thus affording an inner tube of great strength and durability, obviating all of the troublesome difficulties encountered in the use of the ordinary types of rubber inner tubes.

I am aware that different kinds of fabric and armor mesh may be used in place of the kinds shown in Figs. 4 and 5, and also that various other details of construction may be varied through a wide range without departing from the principles of this invention as claimed, and I therefore do not purpose limiting the patent granted otherwise than necessitated by the prior art.

I claim as my invention:

1. In an inner tube of the class described, a rubber investment, a layer of fabric embedded in said rubber investment to reinforce the same, having the sides overlapped on the tread and a reinforcing armor mesh disposed between the overlapped sides on the tread.

2. In an armored inner tube a fabric mesh having the margins overlapped, a metallic mesh between said overlapped margins and a rubber investment for said mesh having a thin wall in each side of the overlapped margins and a wall on each side of the single layer of mesh gradually increasing in thickness from one edge of the overlapped mesh to the other edge.

3. In a reinforced inner tube of the class described, a rubber investment, a unitary fabric reinforcing means embedded therein with the margins thereof overlapping each other to afford two layers of fabric in the outer half of said investment and a single layer in the inner half thereof, and a single layer of armor mesh disposed between the overlapping margins of said fabric to further reinforce said rubber investment.

4. In an inner tube for vehicle tires of the class described comprising a reinforcing knit fabric disposed completely around the tube with the margins thereof overlapping one another in the outer half of the tube and with the edges of said margins disposed diametrically opposite one another, a reinforcing armor mesh disposed between the overlapping margins of said fabric with the edges thereof disposed adjacent the edges of said fabric margins, and a coating of rubber completely embedding said fabric and armor mesh to form an elastic inner tube of uniform thickness.

In testimony whereof I have hereunto subscribed my name in the presence of two subscribing witnesses.

HARRY H. SCHUSTER.

Witnesses:
CHARLES W. HILLS, Jr.,
EARL M. HARDINE.